US005868236A

United States Patent [19]
Rademacher

[11] Patent Number: 5,868,236
[45] Date of Patent: Feb. 9, 1999

[54] PIN VENDING DISPENSER

[75] Inventor: Darrell G. Rademacher, 4253 Dewey Dr., New Port Richey, Fla. 34652

[73] Assignee: Darrell G. Rademacher, Port Richey, Fla.

[21] Appl. No.: 757,586

[22] Filed: Nov. 27, 1996

[51] Int. Cl.⁶ .............................. G07F 7/10; H04M 17/00
[52] U.S. Cl. ............................ 194/217; 379/144; 705/44
[58] Field of Search ............................... 379/144; 705/39, 705/44; 235/382, 382.5; 221/2; 194/217

[56] References Cited

U.S. PATENT DOCUMENTS 5,409,092  4/1995  Itako et al. ............................... 194/210
5,673,309  9/1997  Woynoski et al. ....................... 379/144
5,696,908 12/1997  Muhlberger et al. ...................... 705/39

Primary Examiner—F. J. Bartuska
Attorney, Agent, or Firm—Trapani & Molldrem

[57] ABSTRACT

A phone card vending machine has a secure, locking cabinet; a card dispenser; a bill acceptor or similar cash acceptor; a printer for printing slip receipts containing an activated PIN; and a controller board within the cabinet and connected to the dispenser, printer, and cash acceptor. The card dispenser contains a supply of zero-value telephone cards. The controller board has a PIN memory that stores PIN numbers for each of several amounts of long distance calling time. The customer purchases a card by inserting paper currency or coins, and making a selection from a keypad on the cabinet. The customer can select from eight (or more) different values, and then presses a select button to dispense the card. At the time the card is dispensed, the printer also prints and dispenses a paper receipt that shows the purchase price, including any relevant taxes, the amount of long distance service time purchased, and the PIN number. The vend machine can replenish its stock of activated PIN numbers by modem from a remote location.

18 Claims, 4 Drawing Sheets

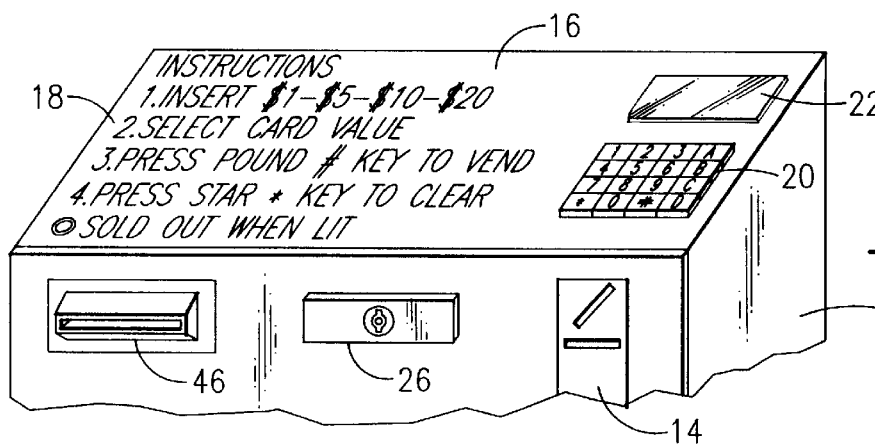
FIG.3
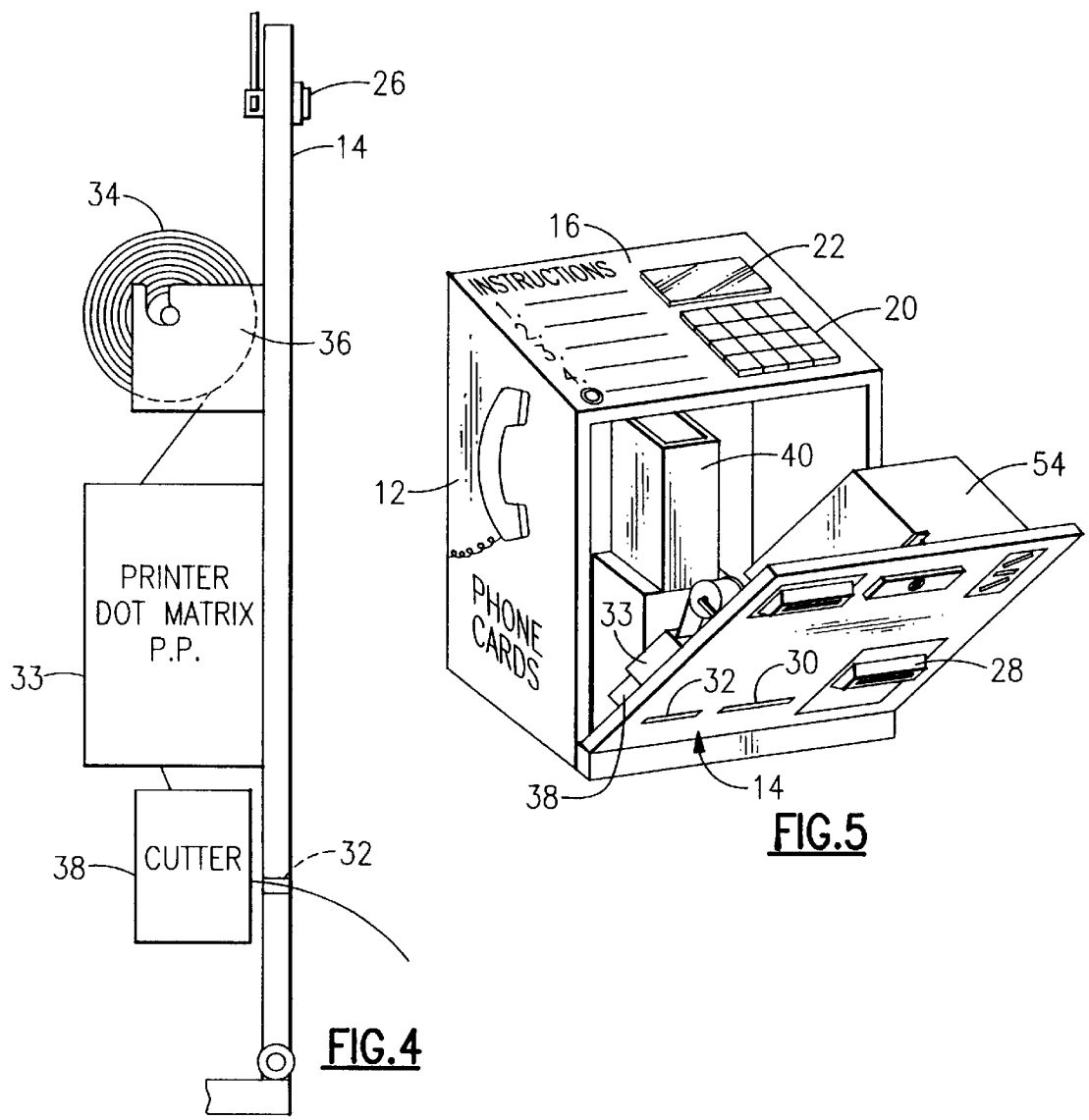
FIG.4
FIG.5

XYZ TELE-CARD
INSTRUCTIONS:

1. DIAL 1-888-"CALL XYZ"
2. WAIT FOR TONE
3. DIAL AC + TEL #
4. ENTER ID-DIGIT PIN
   ON YOUR RECEIPT

THANK YOU FOR
USING XYZ !

PURCHASE VALUE: $20.00

VAT----
S&L TAX---$1.20

PIN #
= 6163 456 789 =

"FOR ADDITIONAL TIME
PLEASE CALL"
1-888-555-6789

SIXTY MINUTES

PIN VENDING DISPENSER

BACKGROUND OF THE INVENTION

This invention relates to dispensing mechanisms, and is more particularly directed to devices for vending items, e.g., pre-paid debit cards (such as telephone long-distance calling cards) when a customer has deposited a predetermined amount of money into a coin and/or currency acceptor device.

Self-service card vending machines have become popular at locations where customers are likely to need to make local, regional, or long-distance calls. These machines are frequently located at airports, convenience stores, college student centers, and near pay telephone banks. The cards typically carry a toll-free access number, and a code or PIN number that the customer also dials for authority to connect to a distant party. Each card has a unique PIN number, which must be activated at the long-distance company at or before the time that the card is sold to the customer. These cards are variously referred to as phone cards, long distance cards, prepaid phone cards, debit cards, or telecards. These cards typically come in denominations such as $10, $20, or $50, which can correspond to 30 minutes, 60 minutes, or 150 minutes of long-distance calling time, respectively.

The current state of the art in card vending mechanisms requires the card dispenser to be interfaced with a main control board that is in turn connected to the currency acceptor or coin acceptor. The card venders are set up to dispense a single debit card when the controller provides the dispenser with an impulse. For example, the customer inserts a ten-dollar bill into the currency acceptor, and the card dispenser dispenses a card carrying ten dollars of long distance service, e.g., thirty minutes of calling time. Some card dispensing machines can dispense two values of card, e.g., a ten dollar card and a five dollar card. Current technology requires separate card dispensers for the five dollar cards and for the ten dollar cards, with each containing a respective supply of these phone cards. This means that the machine requires two mechanical dispensing mechanisms, as well as two separate supplies of cards which require pre-authorized phone card PIN numbers.

One drawback with present-day prepaid debit phone cards, is that the cards are printed to carry the actual phone time controlled with a PIN (personal identification number) that is also printed on the card. The PIN is typically a ten digit number that the customer is required to dial in when using the card to access the long distance service. Typically, the long distance carrier will provide the phone card seller with a batch of PIN numbers, and will charge the card seller a fee for activating those PIN numbers. In the current dispensing machines, all of the PIN numbers on the telephone debit cards have to be activated at the time they are placed in the dispenser, because customers will use the calling service immediately upon purchasing the card. This means that the phone card seller has to purchase a large inventory of activated PIN numbers well before the cards are sold, tying up significant capital. Also, because the vending machines contain a large supply of cards, all with activated PIN numbers, the phone card vending machines are an attractive target for theft.

Moreover, phone card dispensing machines do not provide a separate receipt. Many locations charge sales and local taxes on the sales of these cards, on top of any telephone taxes, and foreign jurisdictions may impose a value-added tax (VAT). While it is useful, and in many cases a business necessity, to keep track of these taxes, there is no record of them provided with the phone debit cards. In some cases, e.g., in connection with charitable use, a refund of the sales tax or VAT can be requested, but the request typically requires a receipt or similar substantiation.

Another problem with current prepaid debit phone cards is that, with the value being loaded on the card when printed, there is a very limited range of different value cards that can be purchased at a given dispensing station. Typically only one value or two values of phone cards are available from a given vending machine.

OBJECTS AND SUMMARY OF THE INVENTION

Accordingly, it is an object of this invention to provide a self-service vending station for dispensing prepaid long distance phone debit cards, or other similar items, in which the customer can purchase a range of values of long distance service, and which dispenses a slip receipt that contains information about the value of service purchased, and on which the activated PIN is also printed.

It is another object to provide a self-serve vending station of this type which is operative to communicate with a central location and obtain activation of the phone card PIN numbers shortly prior to purchase, or at the time of purchase of the card, so as to reduce the current inventory of activated PIN numbers and also to reduce the attraction of the machine as a target of theft.

It is a further object to provide a self-serve vending station which allows the customer to select the value of card within a rather wide range of values, e.g, $1, $2, $5, $10, $20, $30, $50, or $100.

In accordance with an aspect of the present invention, an automated self-serve vending station for prepaid telephone cards permits a customer to select the amount of prepaid long distance service from a plurality of predetermined amounts of long distance service, and provides the customer with a telephone card and a separate slip carrying a PIN that authorizes the customer to use up to the selected predetermined amount of long distance service. A secure lockable cabinet has an interior and an exterior, with a card dispenser being contained in the interior of the cabinet for dispensing the telephone cards to the customer through a penetration in the cabinet. A printer within the cabinet has a roll of paper, a supply of self-stick labels, or other printable medium for printing the slips with said PIN and dispensing the same to the customer through a penetration in the cabinet. A payment acceptor means, e.g., a coin and/or bank note acceptor, or a credit card reader, accepts a form of payment from the customer and establishes a credit escrow amount for the customer. A keypad, an array of push buttons, or another selection means allows the customer to select among the range of available predetermined amounts of long distance service. A controller board means within the cabinet is coupled to the card dispenser, printer, payment acceptor means, and selection means. When the customer has deposited sufficient payment into said payment acceptor means and has actuated the selector means for a selected long distance service amount, the controller board means sends a command signal to said card dispenser to dispense a telephone card and communicates with the printer to print the slip with the activated PIN and the selected amount of long distance service, and then dispense said slip to said customer.

Preferably, the telephone cards are no-value cards and are stored in the card dispenser without a PIN thereon. The slip can be printed on paper tape as a conventional receipt, showing not only the PIN but also the purchase price, and the amount of tax, if any. Alternatively, the slip can be printed on a self-stick label which the customer can adhere to the no-value card.

In one preferred embodiment, the controller board includes a PIN memory that stores series of PIN numbers for each of the various available amounts of calling time, and the controller board transfers a respective one of the stored PIN numbers from memory to printer when the customer actuates said selector and purchases a card. A modem can be included, coupled to the controller board and to an external communications line. The controller board can actuate the modem to contact an authorizing agency, e.g., at the long distance carrier or a home office location of the phone card seller, to activate a PIN number or a batch of said PIN numbers, and to store this batch of PIN numbers in the PIN memory.

An alphanumeric display on said cabinet, coupled via the controller board to the payment acceptor, is operative to display a credit escrow amount for the customer, this being the amount of money deposited into the machine before making a purchase selection. The display can also provide other useful customer information or instructions.

The above and many other objects, features, and advantages of this invention will be better understood from the ensuing detailed description of a preferred embodiment, which should be read in conjunction with the accompanying Drawing.

BRIEF DESCRIPTION OF THE DRAWING

FIG. 3 is a side elevation of this embodiment, showing an access door open.

FIG. 4 is a front perspective view of this embodiment, again with the front access door ajar to show the currency acceptor, the printer, and the card dispenser.

FIG. 5 is a side elevation of the front access door showing the printer mechanism.

DETAILED DESCRIPTION OF THE PREFERRED EMBODIMENT

Figure 1:
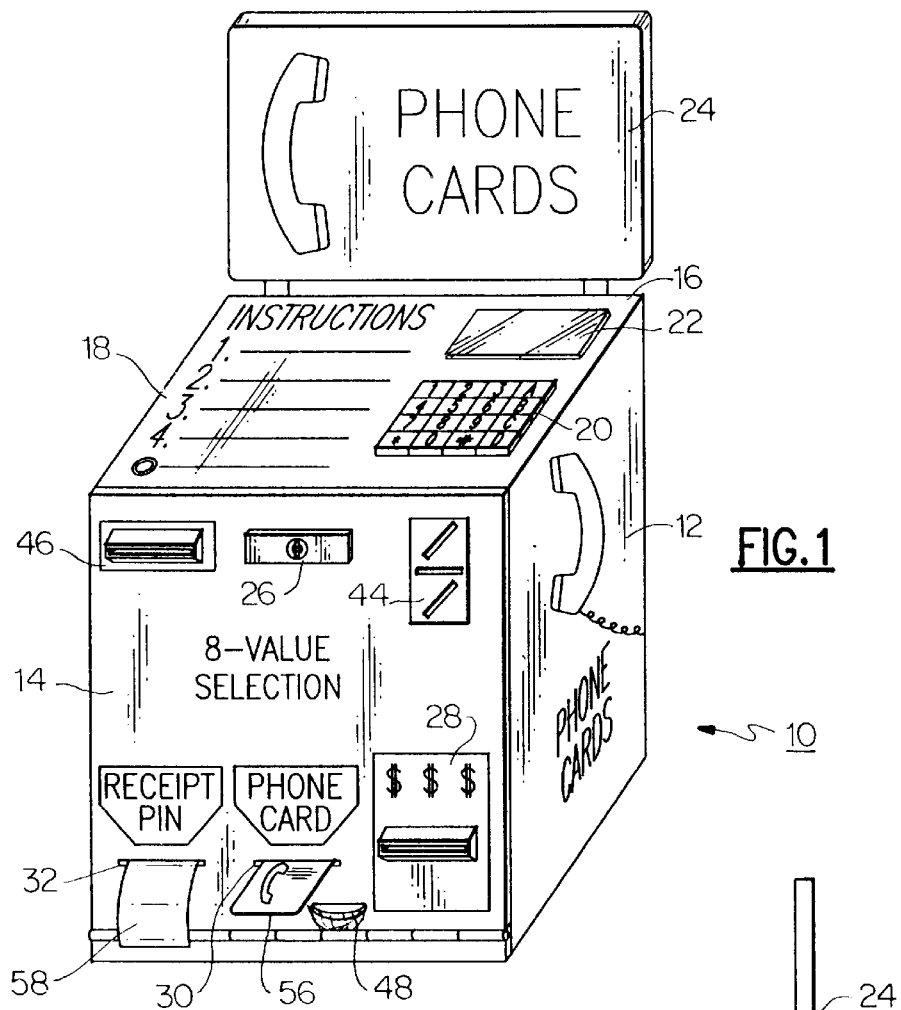
FIG. 1 is a perspective view of a self-service, customer selectable, prepaid phone card vending machine according to one preferred embodiment of this invention.
Figure 2:
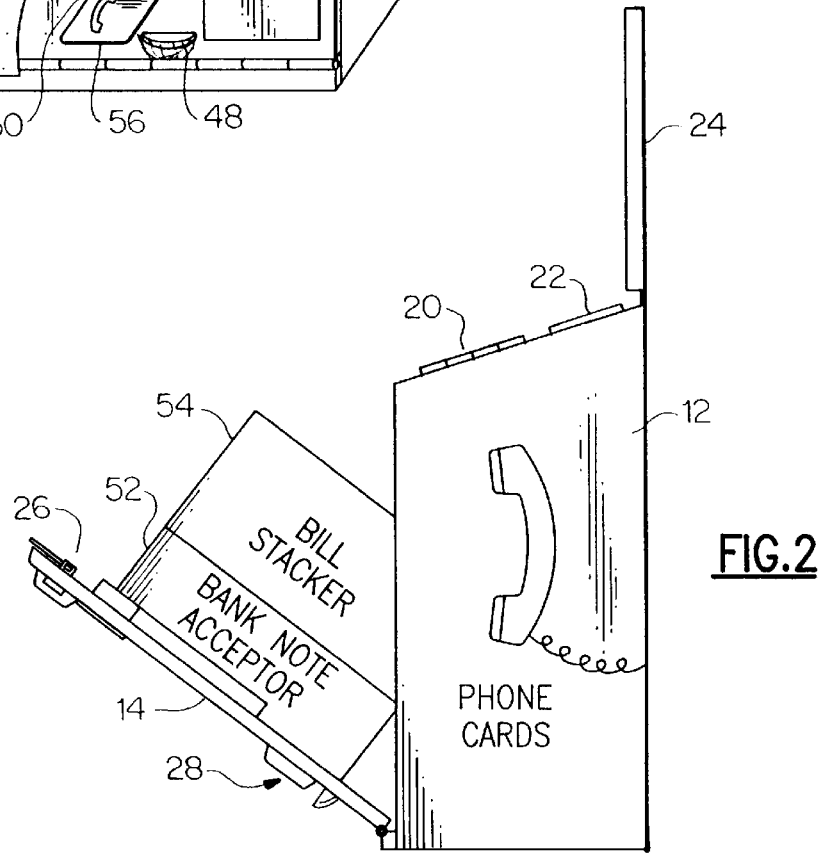
FIG. 2 shows detail of the top surface of the vending machine of this embodiment.

With reference to the Drawing, FIG. 1 shows a vending machine 10 according to one embodiment of this invention, which permits a customer to purchase a prepaid phone debit card at any of eight different values, e.g., $1, $2, $5, $10, $20, $30, $50, or $100. The card can be purchased with paper currency or, optionally, with a combination of paper currency and coins or using a credit card or debit card. The vending machine has a secure locking cabinet or enclosure 12 with a front door 14 that swings open and is key lockable, and a top sloping surface 16 that contains printed customer instructions 18 to assist the customer in making the purchase. On the top surface are also located a key pad 20 having numeric keys zero through nine as well as letter keys A to D, plus a star key (*) and a pound key (#). Above the key pad 20 is a two-by-twenty character backlit LCD display 22. This displays the customer escrow as currency is inserted and also gives the customer prompts to assist in making the purchase. The top surface 16 with the instructions 18, keypad 20 and display 22 are shown in more detail in FIG. 2. A plastic sign 24 is mounted on the back, and extends above the top of the cabinet 12. The cabinet permits the machine to be counter-top mounted, wall mounted, or post mounted, depending on the demands of the location.

At the top of the front door is a key-openable lock 26. When this lock 26 is opened, the door 14 swings down to open, as shown in FIGS. 3 and 4. A currency acceptor 28 disposed in the interior of the cabinet 12 projects through a penetration in the door 14. The currency acceptor is a standard bank note acceptor, and accepts paper currency, e.g., Federal Reserve Notes in usual denominations $1, $2, $5, $10, etc. The door also has a card dispenser slot 30 through which the customer receives the phone card, and a receipt slot 32 through which a receipt slip is dispensed. While the currency acceptor 28 is configured to accept U.S. Federal Reserve Notes, this could be configured alternately to accept Canadian, British, German, Japanese or other foreign currency, or a combination of U.S. and foreign currency.

As shown in FIG. 5, a printer mechanism 33 is mounted on the interior side of the door 14. In this case, the printer mechanism is a dot matrix, plain paper printer. A roll of paper tape 34 is mounted on a paper holder 36 above the printer, and feeds the paper tape to the printer. A cutter mechanism 38 below the printer mechanism 33 cuts the paper tape into individual slips as they are fed through the slot 32. As mentioned before, an alternative arrangement could print on self-stick labels. It is also possible to print directly onto a surface of the cards as they are dispensed.

Figure 6:
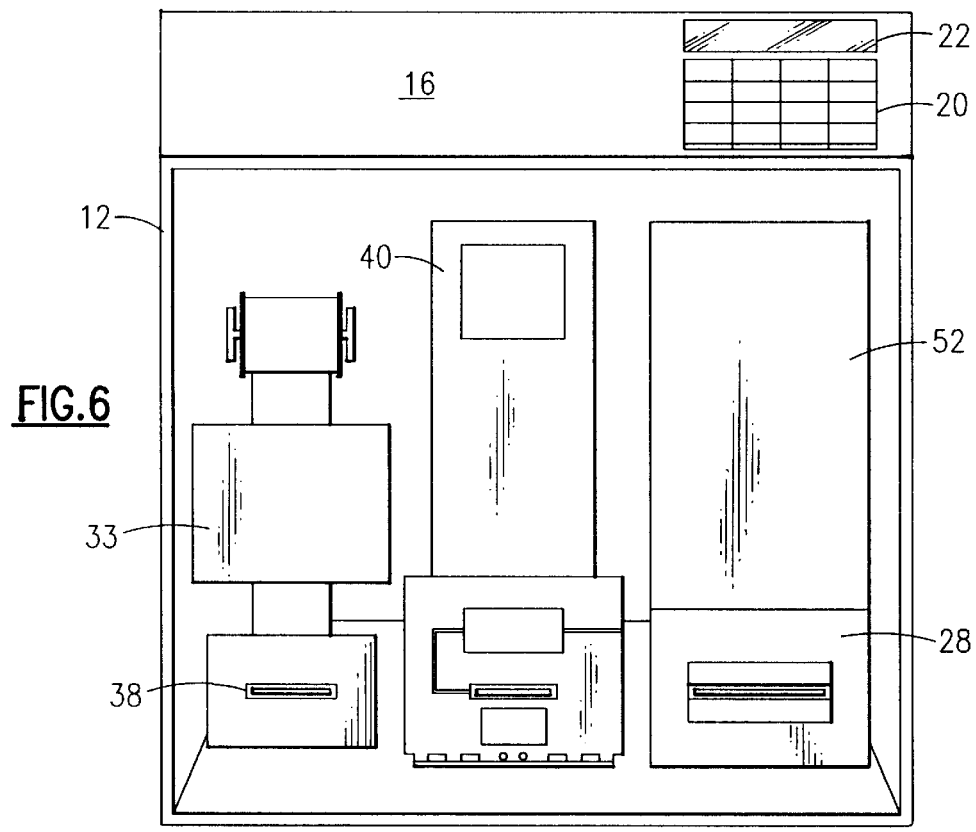
FIG. 6 is a front elevation, partly cut away to show the arrangement of the printer, dispenser, and currency acceptor.

As shown in FIG. 4 and with further reference to FIG. 6, a card dispensing device 40 is situated in the interior of the cabinet 12 and dispenses the purchased cards through the slot 30 in the door 14. Card dispensers of this type are available from market sources, and the preferred dispenser is XCP model 101, sold by XCP, Inc. This device is described in U.S. patent application Ser. No. 60/010,552, filed Jan. 25, 1996. Another possible card dispenser is shown in U.S. Pat. No. 4,993,587. The card dispenser 40 holds a supply of phone cards in a stack, and dispenses them one at a time by means of rubber rollers through the slot 30 in the front door 14 of the cabinet. In this embodiment, the cards are "zero value" cards. That is, the cards carry information and instructions only, and do not bear a PIN number. This will be discussed in detail later.

As shown in FIG. 1, the vending machine can optionally include a coin acceptor 44 and can also include a credit card reader 46, here shown as a "swipe" reader. The machine can also have a change-making capability, and in that case can include a change dispenser 48. The change dispenser can be of a known design, and can have a capability of dispensing some combination of coins, e.g., dollar coins, quarter-dollars, dimes, nickels, and pennies.

As shown in FIG. 3, the bill acceptor has a common bank note acceptor 52 that identifies and verifies the various currency notes that the customer may insert, and a bill stacker 54 with a typical capacity of storing up to six hundred bills.

Figure 7:
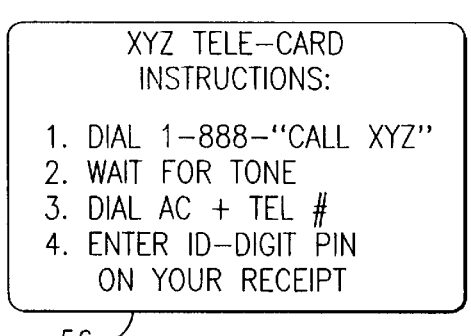
FIG. 7 is a plan view of a no-value phone card as dispensed according to a preferred embodiment.
Figure 8:
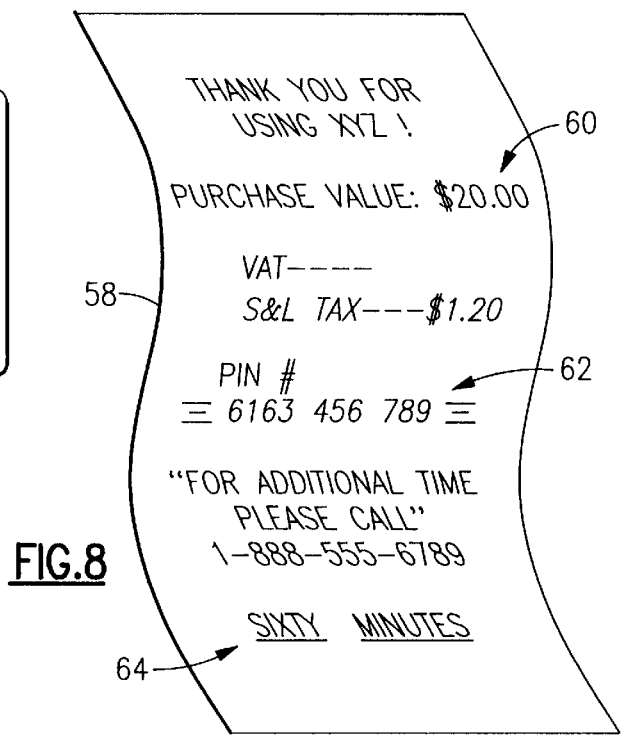
FIG. 8 is an example of a printed receipt printed with the value of prepaid long distance service and a PIN number.

An example of a no-value pre-paid phone card 56 is shown in FIG. 7, and one example of the printed slip or receipt 58 that is produced by the printer 33 is shown in FIG. 8. The card 56 is of standard dimensions and thickness, and can be plastic or paper, for example. The card 56 contains instructions about how to use the long distance service, but does not contain any PIN or other authorization codes. The slip or receipt 58 is printed with purchase information 60 including the purchase price and the amount of the purchase price that represents applicable taxes. Below this is the particular PIN 62 which the customer is to dial in to make use of the purchased long distance service. The PIN 62 is typically a ten digit code, and has been activated at the long distance carrier. The receipt 58 also carries the total amount of calling time purchased 64, here printed at the bottom of the slip 58. Other data, graphics, and relevant information can be included on the slip, as desired. For example, the slip can carry information on how to obtain additional calling time. In addition, advertizing for other services, or for the goods or services of third-parties, can be carried on either the front or reverse of the slip 58. While the slip or receipt 58 in this embodiment is a plain paper receipt, in other embodiments the receipt can be printed onto a self-adhering label, which the customer can affix, as the customer's option, onto the card 56. In other possible embodiments, the printer can print the receipt data directly onto the zero-value cards 56.

Figure 9:
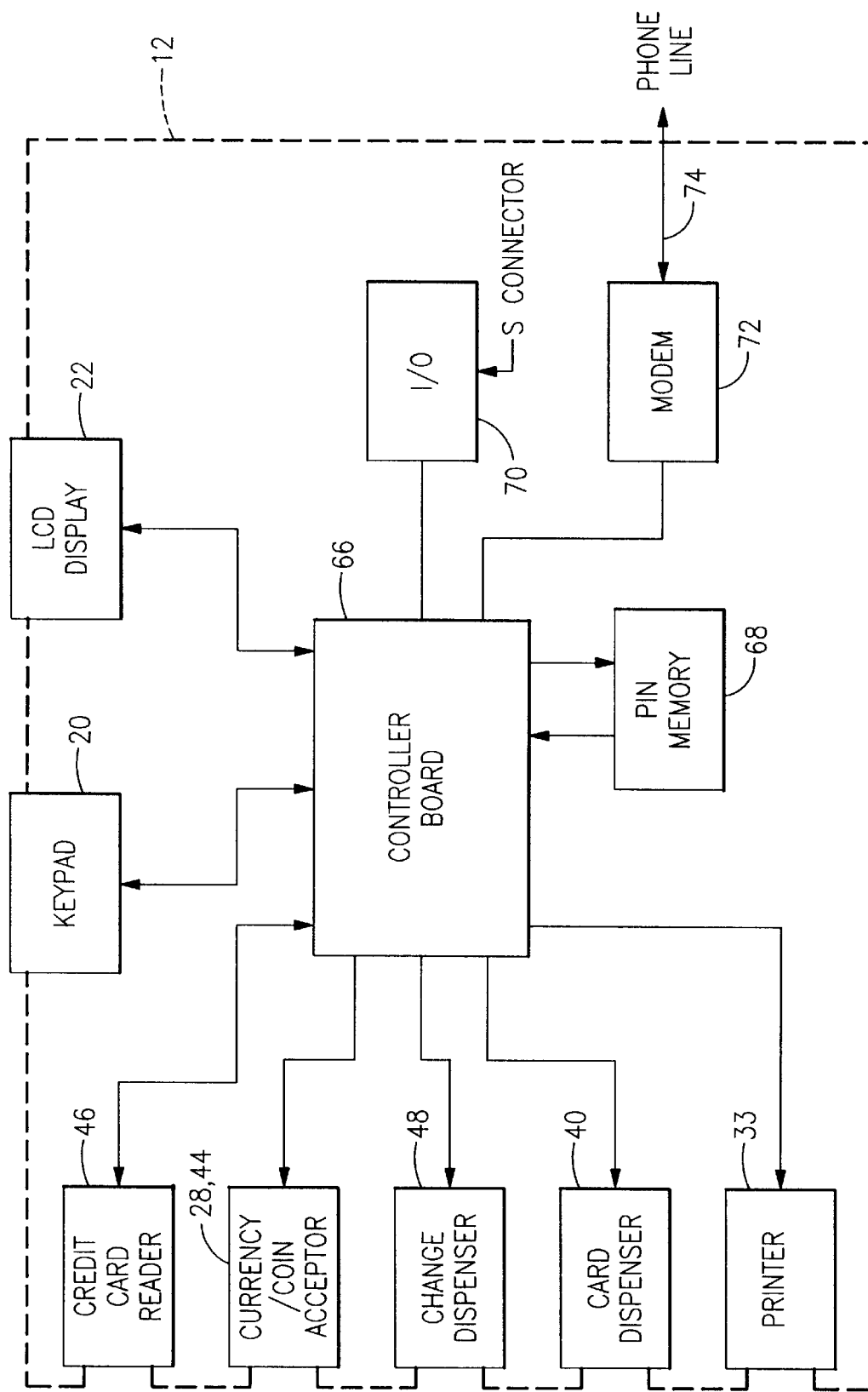
FIG. 9 is a block schematic diagram of the preferred embodiment.

A general schematic of the vending machine 10 of this embodiment is shown in FIG. 9. Here, the parts and elements that have been discussed earlier are identified with the same reference numbers, but are illustrated simply as boxes. Contained within the enclosure or cabinet 12 are the credit card reader 46, the currency and coin acceptors 24, 44, the optional change dispenser 48, the phone card dispenser 40, and the receipt printer 33. The key pad 20 and the associated LCD display device 22 are shown at the top of the cabinet 12. Within the cabinet a microprocessor-based controller board 66 controls the vend operation, and is coupled to all of the above-mentioned elements. The controller board also has a memory register 68 or PIN memory for storing the PIN numbers that are printed onto the receipts 58 when the customer makes a purchase. The controller board is also coupled to an input/output circuit 70 with an associated connector, which is accessible by authorized personnel when the lockable front door 14 is opened. The board 66 is also coupled to a modem 72 that permits communications with remote sites over a telephone line 74.

The ten-digit PIN values are ten-digit comma-delimited ASCII data files, and are stored as such in separate registers in the PIN memory 68. In this embodiment, there are eight selectable calling times available, and each has an associated set of PIN numbers assigned. There PIN values are downloaded over the modem 72 and phone line 74 from a central station, and are processed through the controller board 66. The PIN memory has 32K of storage divided into eight (8) registers. Each of the registers has a column for the time, date and month, and the ten-digit PIN. Typically, each of the registers will hold about fifty PINs. The controller board also has thirty-two individual meters to track the number of dollars inserted, the number of coins inserted, the totals of each value dispensed, total value of all combined values dispensed, and total credit card sales.

Because the amount of long distance service that is being purchased can be selected from eight different values, and the prepaid amount is printed onto the receipt 58, the customer is asked to enter the desired amount on the keypad 20. The customer generally only needs to follow the simple instructions 16 printed on the top of the machine. After inserting money or other suitable form of payment, e.g., into the currency acceptor 28, the customer enters the card value on the key pad 20. For example, for ten dollars of long distance service, the customer can push the "1" key and the "0" key, and then can push the "pound" (#) key to dispense the card 56. If the customer makes an error in entering his or her selection, the customer can push the "star" (*) key to clear. The display 22 carries appropriate customer prompts, and additional instructions. A total-amount-vended meter on the board 66 tracks the sales of each selected value of long distance service, i.e., for each card amount.

The eight values or amounts can be tracked or changed as desired, by a trusted employee using the keypad 20 and LCD display 22, with password protection. Also, the meters can be read via a computer data link, either directly using the I/O 70 or over the modem 72 from an outside source.

As the amount of available long distance service is purchased by consumers, and the PIN values stored in the PIN memory 68 are consumed, additional PIN numbers can be downloaded from a remote site, via the phone line 74 and modem 72. This can be machine-initiated on an as required basis, or the machine 10, and others like it, can be polled by the operator at the remote site. Because the unpurchased cards 56 in the card dispenser 50 do not contain a PIN, the unpurchased cards do not present serious a risk of theft. Several hundred cards can be stored in the machine, and the supply replenished on a scheduled basis. Also, because only a single supply of phone cards is needed for a variety of long distance service amounts, only a single card dispenser 50 is required, and other costs, such as card inventory, is significantly reduced.

It should be understood that many items other than phone cards can be dispensed in this arrangement, for example, lottery tickets or cards; bus, train, or subway tickets; postage, etc. Also, the currency acceptor could be adapted to accept currency of two different countries, e.g., U.S. and Canada, for example at border crossings and at airports. The controller board in that case could be suitably programmed to assign the proper exchange rate to the currencies.

There are many variations of the vending station which incorporate the features and advantages mentioned above. While the invention has been described with reference to a preferred embodiment, it should be recognized that the invention is not limited to that precise embodiment. Rather, many modifications and variations would present themselves to persons skilled in the art without departing from the scope and spirit of the invention, as defined in the appended claims.

I claim:

1. Automated self-serve vending station for prepaid telephone cards at which a customer is able to select the amount of prepaid long distance service from a plurality of predetermined amounts of long distance service, and which provides the customer with a telephone card and a separate slip carrying a PIN that authorizes the customer to use the long distance service up to the selected predetermined amount; the vending station comprising:

a secure lockable cabinet having an interior and an exterior;

a card dispenser contained in the interior of said cabinet for dispensing said telephone cards to the customer through a penetration of said cabinet;

a printer within said cabinet including a supply of printable medium for printing said slip with said PIN and at least one additional number, and dispensing the same to the customer through a penetration in said cabinet;

a payment acceptor means for accepting a form of payment from a customer and establishing a credit escrow amount for the customer;

selection means for said customer for selecting among said plurality of said predetermined amounts of long distance service;

a PIN memory for storing a plurality of activated PINs separate from said additional number, the latter being stored in a separate memory; and controller board means within said cabinet and coupled to said card dispenser, said printer, said payment acceptor means, and said selection means such that when the customer has deposited sufficient payment into said payment acceptor means and is actuated said selector means for a selected long distance service amount, the controller board means sends a command signal to said card dispenser to dispense a telephone card, obtains one of said activated PINs from said PIN memory, and communicates with said printer to control same to print said slip with said PIN and said selected long distance service amount and to dispense said slip to said customer.

2. The automated self-serve vending station of claim 1, wherein said telephone cards are no-value cards and are stored in the card dispenser without a PIN thereon.

3. The automated self-serve vending station of claim 1, wherein said supply of medium for said printer includes paper tape, and said slip is printed as a paper tape separate from said card.

4. The automated self-serve vending station of claim 1, wherein said supply of medium includes self-stick labels, and said slips are printed as labels that can be affixed onto said telephone cards.

5. The automated self-serve vending station of claim 1, wherein said controller board includes a PIN memory that stores series of PIN numbers for each of said predetermined amounts, and said controller board transfers a respective one of the stored PIN numbers from said memory to said printer when the customer actuates said selector means.

6. The automated self-serve vending station of claim 4, further comprising a modem coupled to said controller board and to an external communications line, and said controller board is operative to actuate said modem to contact an authorizing agency by means of said communications line to activate a batch of said PIN numbers, and to store said batch of PIN numbers in said PIN memory.

7. The automated self-serve vending station of claim 1, wherein said selector means includes a numeric key pad.

8. The automated self-serve vending station of claim 1, further comprising an alphanumeric display on said cabinet and coupled to said controller board and said payment acceptor, and operative to display the credit escrow amount for the customer.

9. The automated self-serve vending station of claim 1, wherein said payment acceptor means includes a note acceptor for accepting paper currency.

10. The automated self-serve vending station of claim 9, wherein said payment acceptor further includes a coin acceptor for accepting coins from said customer and a changemaker for dispensing coins to said customer when there is an escrow amount remaining after said customer has completed the purchase of the selected amount of long distance service.

11. The automated self-serve vending station of claim 1 wherein said plurality of said predetermined amounts of long distance service includes eight separate amounts, each having a respective purchase price, and said selector means includes means to select a respective one of said eight amounts.

12. The automated self-serve vending station of claim 11 wherein said predetermined amounts of long distance service include three or more different amounts that have respective purchase prices of $1 to $50.

13. The automated self-serve vending station of claim 1 wherein said PIN memory has a plurality of memory compartments, with each memory compartment storing PIN codes for a respective different amount of long distance service.

14. The automated self-serve vending station of claim 1 wherein said printer include means for printing said slip as a receipt containing said PIN number, the cash value of long distance service purchased, and any applicable taxes.

15. Automated self-serve vending station for prepaid telephone long distance service at which a customer is able to select the amount of prepaid long distance service from a plurality of predetermined amounts of long distance service, and which provides the customer with a printed slip carrying a PIN that authorizes the customer to use the long distance service up to the selected predetermined amount; the vending station comprising:

a secure lockable cabinet having an interior and an exterior;

a printer within said cabinet including a supply of printable medium for printing said slip with said PIN and with at least one additional number, and dispensing the same to the customer through a penetration in said cabinet;

a payment acceptor means for accepting a form of payment from a customer and establishing a credit escrow amount for the customer;

selection means for said customer for selecting among said plurality of said predetermined amounts of long distance service; and controller board means within said cabinet, wherein said controller board includes a PIN memory that stores a series of activated PIN numbers separate from said additional number the latter being stored in a separate memory, for each of said predetermined amounts, and said controller board means being coupled to said card dispenser, said printer, said payment acceptor means, and said selection means such that when the customer has deposited sufficient payment into said payment acceptor means and has actuated said selector means for a selected long distance service amount said controller board means transfers a respective one of the stored activated PIN numbers from said memory to said printer when the customer actuates said selector means, and the controller board means communicates with said printer to control same to print said slip with said PIN and said selected long distance service amount and to dispense said slip to said customer.

16. The automated self-serve vending station of claim 15, further comprising a modem coupled to said controller board means and to an external communications line, and said controller board means is operative to actuate said modem to contact an authorizing agency by means of said communications line to activate a batch of said PIN numbers, and to store said batch of activated PIN numbers as a series of same in said PIN memory.

17. The automated self-serve vending station of claim 15, wherein said PIN memory is divided into a plurality of storage registers, and each said storage register is adapted to hold a respective series of PINs, with each said storage register corresponding to a predetermined different amount of long distance service.

18. The automated self-serve vending station of claim 17, wherein said PIN memory is divided into eight storage registers, corresponding to pre deter mined different dollar amounts of long distance service.

* * * * *